United States Patent [19]

Tuss

[11] Patent Number: 4,799,316

[45] Date of Patent: Jan. 24, 1989

[54] COORDINATE MEASURING MACHINE WITH A PROBE SHAFT COUNTER BALANCE SYSTEM

[75] Inventor: John J. Tuss, Englewood, Ohio

[73] Assignee: The Warner & Swasey Company, Cleveland, Ohio

[21] Appl. No.: 139,532

[22] Filed: Dec. 28, 1987

[51] Int. Cl.⁴ .............................................. G01B 5/20
[52] U.S. Cl. ...................................... 33/503; 33/1 M
[58] Field of Search ................................. 33/503, 504

[56] References Cited

U.S. PATENT DOCUMENTS 4,507,868  4/1985  Tuss ................................. 33/503 X
4,631,834  12/1986  Hayashi et al. ....................... 33/503

FOREIGN PATENT DOCUMENTS 0054409  3/1986  Japan ..................................... 33/503

Primary Examiner—Harry N. Haroian
Attorney, Agent, or Firm—John R. Benefiel; Raymond J. Eifler

[57] ABSTRACT

A coordinate measuring machine (10) having a pneumatic probe counterbalance system housed within the probe shaft (14) is disclosed, the system including a piston (54) fit into a cylinder (30) extending along the length of the probe shaft (14). The piston (54) is fixed so that air pressure acts on a cylinder end cap (32) to counterbalance the weight of the probe assembly (12). A stationary tube (34) extends into the cylinder (30) from above the piston (54) and directs a source of regulated air pressure to the cylinder interior (58) from a fluid pressure fitting (48) connected to the upper end of the tube (34). The piston (54) is at least partially spherically shaped and the tube (34) is supported by a spherical bearing (42) to accommodate misalignment of the tube (34) and cylinder (30) without binding during movement of the probe shaft (14). A length of wire (56) is connected at one end to the piston (54) and extends upwardly through the tube (34), and is fixed at its upper end to anchor the piston (54).

8 Claims, 2 Drawing Sheets

COORDINATE MEASURING MACHINE WITH A PROBE SHAFT COUNTER BALANCE SYSTEM

This invention relates to coordinate measuring machines of the type having a vertically movable probe shaft located above a table surface adapted to support objects to be measured, is more specifically related to a counterbalance system for to supporting the weight of the probe shaft.

It is a common practice to provide a counterbalance system for supporting the weight of a probe shaft in coordinate measuring machines, but incorporating such a system into these machines presents particular problems.

These problems have to do with the necessity of eliminating, to the maximum extent possible, even minute frictional or binding forces in the components, since it is well known that such forces contribute to errors in making the measurements by causing slight, nonrepeatable distortions of the machine members.

The probe shaft in such machines may undergo substantial vertical travel in making measurements, and the counterbalance system should desirably not add substantially to the overhead clearance required, else larger models may become unusable in low ceiling spaces.

The challenge of effectively providing a reasonably simple counterbalance system for such applications has led to extensive design efforts, resulting in various mechanical, electrical and pneumatic systems.

Pneumatic counterbalance systems have to date best overcome the problem of friction. In such systems, a piston and connecting rod slidably mounted in a cylinder are used to define a pressure chamber, which components are connected to the probe shaft and fixed machine structure in such a way that fluid pressure may be regulated to effectively balance the weight of the probe shaft. The extensive travel of the probe shaft, particularly for larger machines, leads to problems of binding due to misalignments of the piston, rod, and cylinder.

U.S. Pat. No. 4,389,781 entitled "Pneumatic Counterbalance for a Coordinate Measuring Machine" and issued on June 28, 1983 and U.S. Pat. No. 4,507,868 entitled "Coordinate Measuring Machine with a Self Aligning Pneumatic Counterbalance" and issued on Apr. 2, 1985, each describe pneumatic type counterbalance systems for coordinate measuring machines in which the problems of friction and binding are addressed.

In the arrangement described in each of these patents the piston, rod, and cylinder are mounted alongside of the probe shaft, the piston and rod connected to the probe shaft with an extension arm. This arrangement allows fluid pressure fittings for connection of a pressure source to the cylinder interior to be fixed, to eliminate problems associated with movement of these parts.

Such arrangements, although better than most, create increased overhead clearance requirements, since the cylinder cannot be positioned within the measurement space defined within the machine without reducing the space accessible to the probe for carrying out measurements.

U.S. Pat. No. 4,155,173 entitled "Mounting for Coordinate Measuring Machine Arms and Probes" and issued on May 22, 1979 describes a pneumatic counterbalance system in which the cylinder is mounted within the probe shaft, allowing a more compact construction. In the system described in this patent, the cylinder moves with the probe shaft, while the piston and rod are fixed.

This arrangement is fitted with a fluid pressure supply line and fittings which move with the probe shaft, and the piston and rod installation described is susceptible to misalignment, binding and frictional forces. All of these problems render this systems less advantageous than the foregoing described arrangements.

SUMMARY OF THE INVENTION

The present invention is a coordinate measurement machine of the type including a vertically movable probe shaft incorporating a pneumatic counterbalance system comprising a piston and rod fit in a cylinder, which, in turn, is received within the interior of the probe shaft. The counterbalance system is characterized by a tube extending into the upper endwall closing off the cylinder which delivers fluid under pressure to a chamber defined by the region above the piston. The piston is secured to fixed struture so that the fluid pressure can be adjusted to act on the cylinder endwall.

In a first embodiment, this is accomplished by means of a length of wire, affixed at one end to a spherical ball piston, the length of wire extending through the tube which terminates short of the piston to create a gap through which fluid may pass in pressurizing the chamber. The other end of the wire is connected to relatively fixed structures in the machine to fix the piston against relative movement as a result of the exertion of fluid pressure in the chamber.

In a second embodiment, the tube extends to be joined to the piston, the piston formed with partially spherical side walls fit into the cylinder. An internal bore and cross passage connect the tube interior with the cylinder pressure chamber.

In both embodiments, at least partially spherical side walls of the piston and its wire support accommodate misalignments with the cylinder walls to eliminate any tendency for binding conditions to develop.

In both embodiments, the tube is also connected to fixed structure so that fluid pressure supply fittings and lines are connected thereto and are not subjected to movement as the probe shaft is raised and lowered. The tube passes through an upper endwall of the cylinder with a clearance therebetween and is held with a spherical bearing, so that misalignments between the tube and the cylinder likewise do not create any binding effects.

The present invention has the advantage of allowing shaft mounting of a counterbalance piston and cylinder arrangement within the interior of the probe shaft while minimizing friction and binding, and any necessity for movement of the fluid pressure supply components while the probe shaft is manipulated.

DETAILED DESCRIPTION

Figure 1:
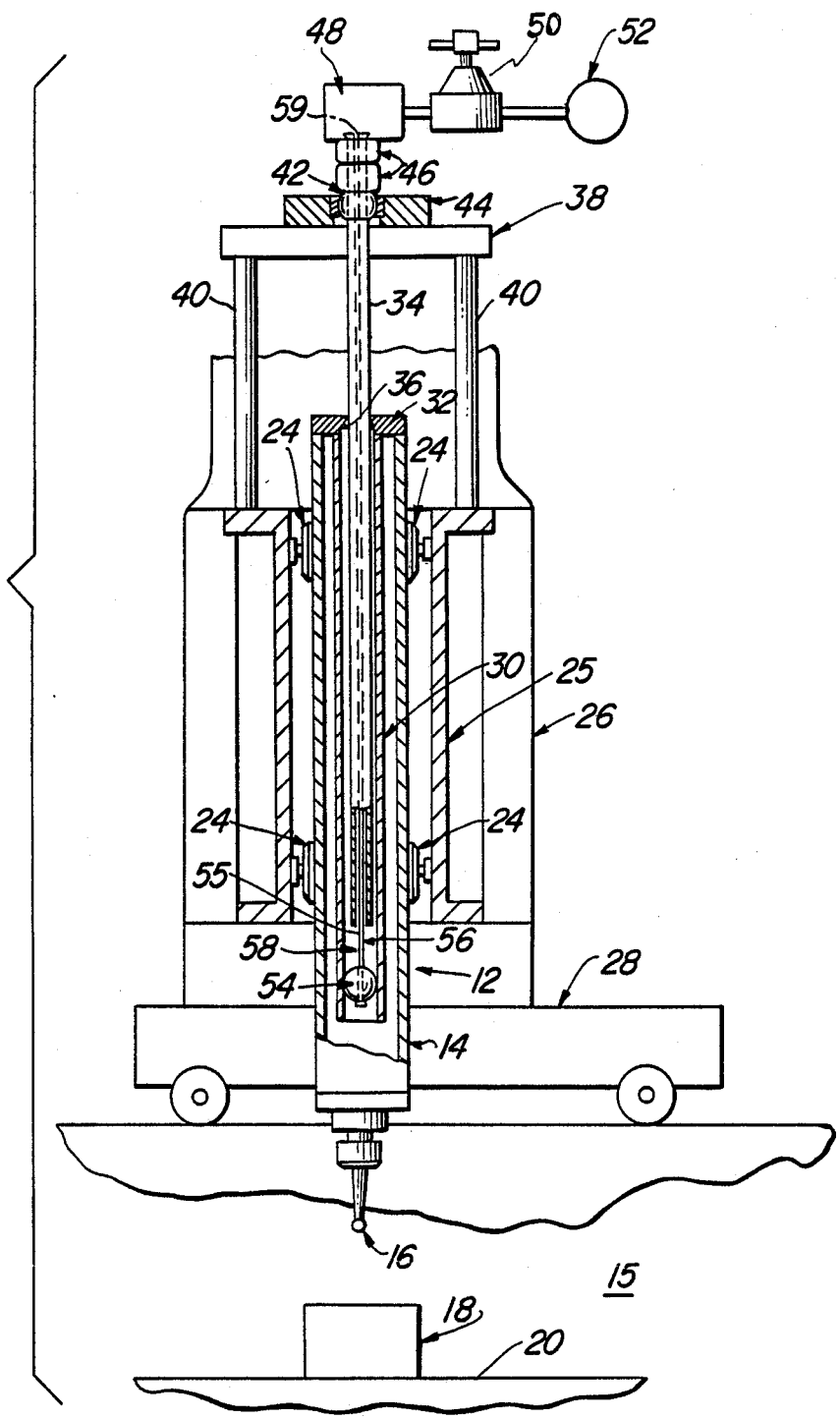
FIG. 1 is a front elevational view in partial section of portions of a coordinate measuring machine, showing the counterbalance system according to the present invention.

FIG. 1 shows portions of a coordinate measuring machine 10 of a well known type having a probe assembly 12 including a rectangularly shaped probe shaft 14 carrying a probe tip 16 adapted to engage an object 18 to be measured. The object 18 is supported on a surface 20 formed on stationary table structure 22 included in the machine 10, the space below a cross member 28 and above surface 20 comprising the measuring space 15 within which measurements may be carried out. The probe assembly 12 is mounted for up and down movement as by air bearings 24 carried by support members 25 included in a carriage 26 fixed in relation to the vertical movement of the assembly 12 probe. The carriage 26 in turn is supported for movement along a first horizontal axis on a cross member 28, which itself would be typically mounted for movement along a second horizontal axis orthogonal to the first axis, in the manner well known in the art. See U.S. Pat. No. 4,594,791 "A Bridge Type Coordinate Measuring Machine" and issued on June 17, 1986 for an example of a three-axis coordinate measuring machine of this type.

The net result of this arrangement is to enable guided movement of the tip 16 of the probe shaft 14 along three different orthogonal axes, which movement is detected and measured by transducers (not shown) and displayed/recorded by suitable electronics (not shown) to enable measurement of the object 18 by moving the tip of the probe 16 between the features of interest, all in thee manner now well known in the art. See U.S. Pat. No. 2,886,717 and 2,886,718 entitled "Measuring Apparatus" both issued on May 12, 1959 for a description of the basic principles of transducing and electronic circuitry suitable for this application.

It is critical for the accuracy of such machines that friction and binding be minimized in the movement of the various components, since frictional forces can cause non repeatable deflections tending to create measurement errors. The weight of the probe assembly 12 must be supported while enabling free vertical movement thereof. According to one aspect of the concept of the present invention, a counterbalance system is disposed within the interior of the probe shaft 14, and includes a cylinder 30 extending lengthwise within the probe shaft 14. The upper end of the cylinder 30 is closed off by means of an upper end cap 32, which end cap 32 also extends over the upper end of the probe shaft 14 and is also affixed thereto. A tube 34 is disposed within the cylinder 30 extending along the length thereof, with the upper end protruding out of the cylinder 30 through a clearance bore 36 of end cap 32. The tube 34 extends upwardly through relatively fixed structure comprised by a platform 38 included in the carriage 26, platform 38 supported on extension rods 40. The tube 34 is axially fixed by means of a spherical bearing 42 carried by a plate 44 resting atop platform 38. A pair of threaded fittings 46 are threaded to the O.D. of the tube to join the same to a fluid pressure manifold block 48, connected to a variable pressure regulator 50 in turn receiving air under pressure from a source of air pressure 52. Fitted within the cylinder 30 is a substantially spherical piston 54, held by a length of wire or cable 56 fixed at one end to the piston 54. The length of wire 56 extends across a gap 55 between the lower end of the tube 30 and the piston 54. Gap 55 allows air to enter the space within the cylinder 30 between the piston 54 and the end cap 32 thereby defining a pressure chamber 58. A length of wire 56 extends upwardly within the tube 34 and has its other end held by a cross pin 59 to be anchored so as to resist movement of piston 54 when the chamber 58 is pressurized.

Accordingly, by pressurization of the pressure chamber 58 above the piston 54, the force generated by fluid pressure acting on the interior of the end cap 32 is not nullified and acts to counteract the weight of the probe shaft 14. Regulator 50 may be adjusted to obtain counterbalancing thereof. Thus, the cylinder 30 extends into the measuring space as by being fit within the probe shaft 14, and need not extend to a great height above the machine 12 in accommodating the up and down travel of the probe 14. The air supply 52 is not connected to a moving component but rather the stationary tube 34. The piston 54 is carefully fit within the interior of the cylinder 30 with a slight clearance so that a slight flow of air past the piston 54 will produce an air bearing effect. The same is true of the tube 30 which is fit to the opening 36 in the same manner, which clearance also accommodates misalignments between the tube 34 and cylinder 30. The spherical bearing 42 and spherically shaped piston 54 also act to accommodate misalignments without resulting in binding forces. The use of a wire (56) may be dispensed with if the need to accommodate misalignments is not great.

Figure 2:
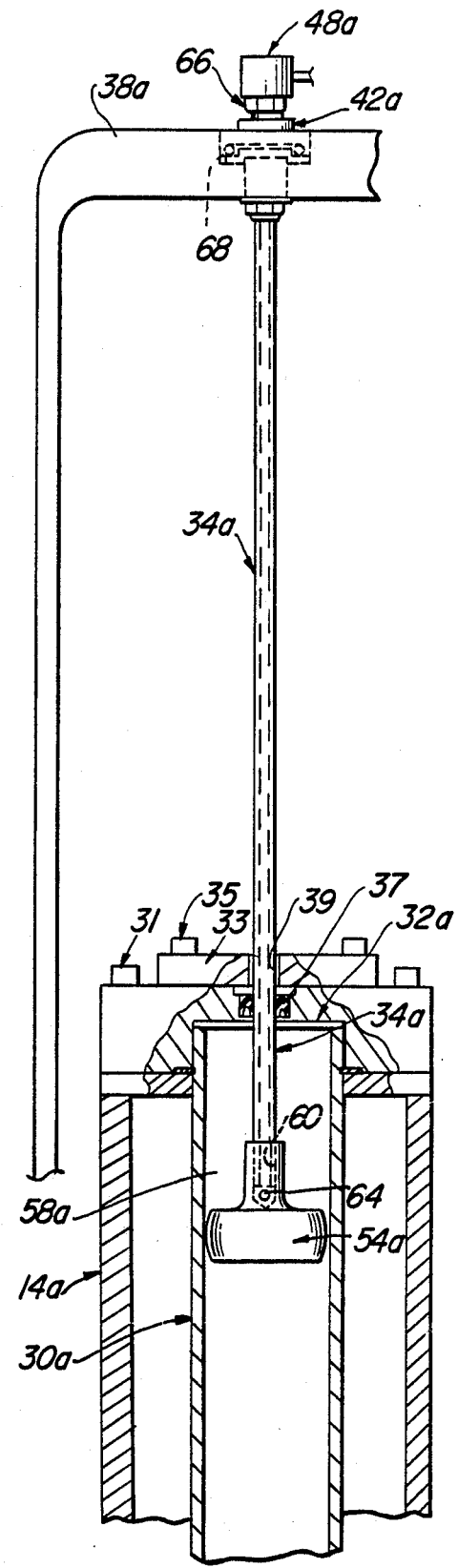
FIG. 2 is an enlarged partially sectional view of a second embodiment of the counterbalancing system according to the present invention.

FIG. 2 shows an alternate embodiment of a counterbalancing system in which a wire 56 is not used. This system includes the cylinder 30a fit within the probe shaft 14, but in this embodiment, a partially spherical piston 54 a is employed, fit within the interior of the cylinder 30a. The tube 34a is connected to the piston 54a by being threaded within a bore 60 formed in a boss formed on the piston 54a. The bore 60 communicates with a cross bore 64 allowing air flow from the interior of the tube 34a into chamber 58a. The tube 34a passes through the end cap 32a which is affixed to the upper end of the probe shaft 14a by capscrews 31, a top plate 33 affixed to the end cap 32a with capscrews 35. A lip seal 37 provides an air seal, although preferably a slight air leakage should be allowed to provide an air bearing effect to reduce friction. A clearance space is provided between the tube 34a and through bore 39 in top plate 33 to allow for slight tilting of the tube 34a to accommodate slight misalignments between the tube 34a and cylinder 30a. The tube 34a extends upwardly and is secured at its upper end to fixed structure 38a, held with a spherical bearing 42a and connected with a manifold block 48a. Retainer nuts, 66 secure the connections. A fluid seal 68 is also provided. Thus, misalignments are accommodated and the fluid pressure connections remain stationary as in the first described embodiment.

I claim:

1. A coordinate measuring machine (10) of the type including a probe shaft (14) supported for vertical movement over a horizontal surface (20) that is adapted to support an object (18) to be measured by the probe, and a counterbalance system for the probe shaft (14) that includes: a piston (54,54a) and vertically extending cylinder (30,30a) into which said piston (54,54a) is fit, said cylinder having an upper end wall (32,32a) to create a pressure chamber (58,58a) above said piston (54,54a), said pressure chamber (58,58a) supplied from fluid pressure supply means (48,48a); structure (38,38a) relatively fixed with respect to said probe; and, means securing said relatively fixed structure (38,38a) to said piston (54,54a), so that fluid pressurizing of said pressure chamber (58,58a) enables counterbalancing of the weight of the probe shaft (14), said counterbalance system characterized by:

an elongated tube (34,34a) entering into said cylinder (30,30a) from the upper end thereof, extending along said cylinder (30,30a) and terminating above said piston (54,54a), said relatively fixed structure (38,38a) mounting the upper end of said tube (34,34a) protruding from said cylinder (30,30a) allowing the introduction of pressurized fluid through said tube (34,34a) to pressurize said chamber (58,58a).

2. The coordinate measuring machine (10) according to claim 1 characterized by means (42,42a) mounting said tube (34,34a) within said cylinder (30,30a) (14) so as to accommodate misalignments within said cylinder (30,30a).

3. The coordinate measuring machine according to claim 2 wherein said piston (54,54a) is characterized by having at least partially spherical sides mating with said cylinder interior to accommodate misalignments of said piston (54,54a) with said cylinder (30,30a).

4. The coordinate measuring machine according to claim 3 characterized by said means securing said piston (54) to said fixed structure (38) comprising a length of wire (56) connected to said piston at one end passing upwardly through said tube (34) and connected at the other end to said fixed structure (38) to accommodate misalignments with said cylinder; and said tube (34) terminating short of the piston (54) to create a gap (55) therebetween enabling fluid communication with said chamber (58) via said tube (34).

5. The coordinate measuring machine (10) according to claim 3 characterized by said means securing said piston (54a) to said fixed structure (38a) comprising means (60) securing the lower end of said tube (34a) to said piston (54a), said fluid pressure supply means including a cross passage (64) in said lower end of said tube (34) entering into said chamber (58).

6. The coordinate measuring machine (10) according to claim 1 characterized by said mounting means comprising a spherical bearing (42,42a), secured to the upper end of said tube (34,34a) connected to said fixed structure (38,38a) to accommodate misalignments with said cylinder (30,30a).

7. The coordinate measuring machine (10) according to claim 6 characterized by a clearance space between said cylinder upper end wall (32,32a) and said tube (34,34a) to accommodate misalignments between said tube (34,34a) and said cylinder (30,30a).

8. The coordinate measuring machine (10) according to claim 4 characterized by said piston (54) comprising a ball (54) fixed to said one end of said length of wire (56).

* * * * *